INVENTOR.
WILLIAM W. PHARIS
BY T. L. Bowes
ATTORNEY

May 22, 1956 W. W. PHARIS 2,747,016

CONVERSATION TIMING CIRCUIT

Filed Nov. 14, 1952 8 Sheets-Sheet 2

INVENTOR.
WILLIAM W. PHARIS

BY T. L. Bowes

ATTORNEY

May 22, 1956 W. W. PHARIS 2,747,016

CONVERSATION TIMING CIRCUIT

Filed Nov. 14, 1952 8 Sheets-Sheet 3

INVENTOR.
WILLIAM W. PHARIS
BY T. L. Bowes
ATTORNEY

May 22, 1956 W. W. PHARIS 2,747,016

CONVERSATION TIMING CIRCUIT

Filed Nov. 14, 1952 8 Sheets-Sheet 4

INVENTOR.
WILLIAM W. PHARIS
BY T. L. Bowes
ATTORNEY

May 22, 1956 W. W. PHARIS 2,747,016

CONVERSATION TIMING CIRCUIT

Filed Nov. 14, 1952 8 Sheets-Sheet 5

INVENTOR.
WILLIAM W. PHARIS
BY T. L. Bowes
ATTORNEY

May 22, 1956 W. W. PHARIS 2,747,016

CONVERSATION TIMING CIRCUIT

Filed Nov. 14, 1952 8 Sheets-Sheet 6

INVENTOR.
WILLIAM W. PHARIS
BY T. L. Bowes
ATTORNEY

INVENTOR.
WILLIAM W. PHARIS
BY T. L. Bowes
ATTORNEY

May 22, 1956 W. W. PHARIS 2,747,016

CONVERSATION TIMING CIRCUIT

Filed Nov. 14, 1952 8 Sheets-Sheet 8

INVENTOR.
WILLIAM W. PHARIS

BY T. L. Bowes

ATTORNEY

United States Patent Office 2,747,016

Patented May 22, 1956

2,747,016

CONVERSATION TIMING CIRCUIT

William W. Pharis, Rochester, N. Y., assignor, by mesne assignments, to General Dynamics Corporation, a corporation of Delaware Application November 14, 1952, Serial No. 320,503

6 Claims. (Cl. 179—7.1)

This invention relates to telephone systems and more particularly to conversation timing means for use in telephone systems.

It is an object of my present invention to provide conversation timing means in a trunk circuit whereby the trunk circuit is locked out of an incoming switch or line circuit when a call through the trunk circuit has been timed out.

In carrying out the principles of my invention, I provide means in a dial-to-manual trunk circuit for preventing seizure of the trunk, i. e., lockout, during the interval between time out and operator disconnect. In the preferred embodiment of my invention, I provide two relays in the trunk circuit; the first relay is operated upon seizure of the trunk from the manual office and the second relay is operated upon answering of the extended call by the called party. If the dial apparatus is timed out by conversation timing means, the first relay is released upon release of the switching apparatus and the second relay is employed to prevent re-operation of the first relay on any attempt to seize the trunk from the dial office.

Figure 6:
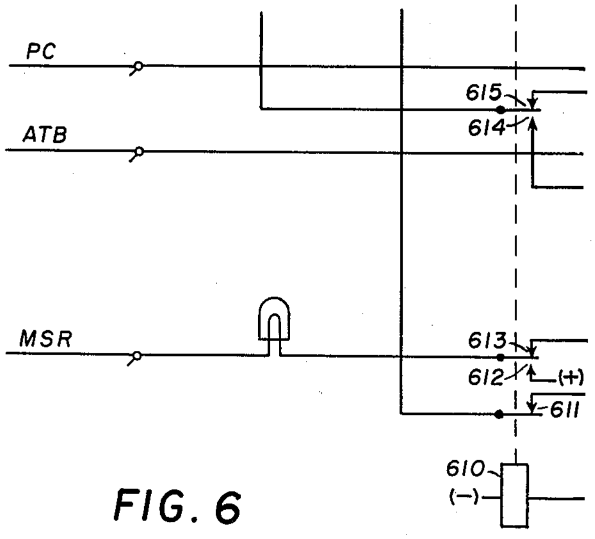
Figure 1:
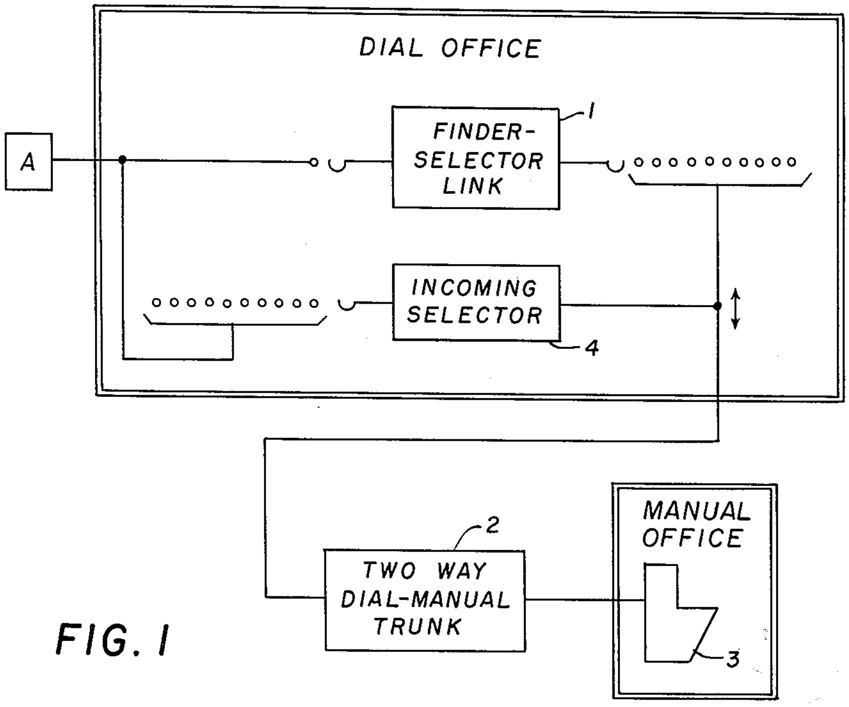
Figure 2:
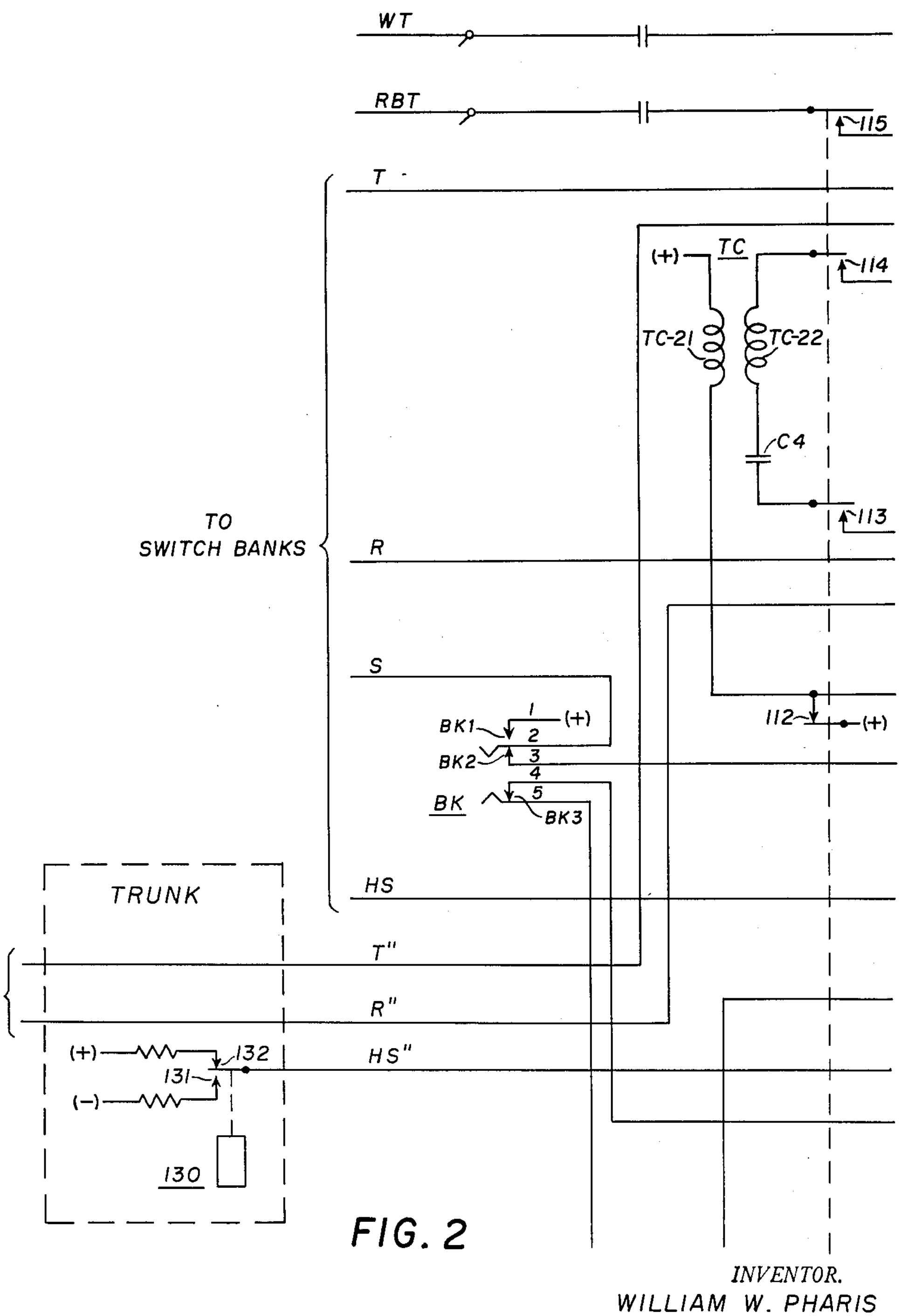
Figure 3:
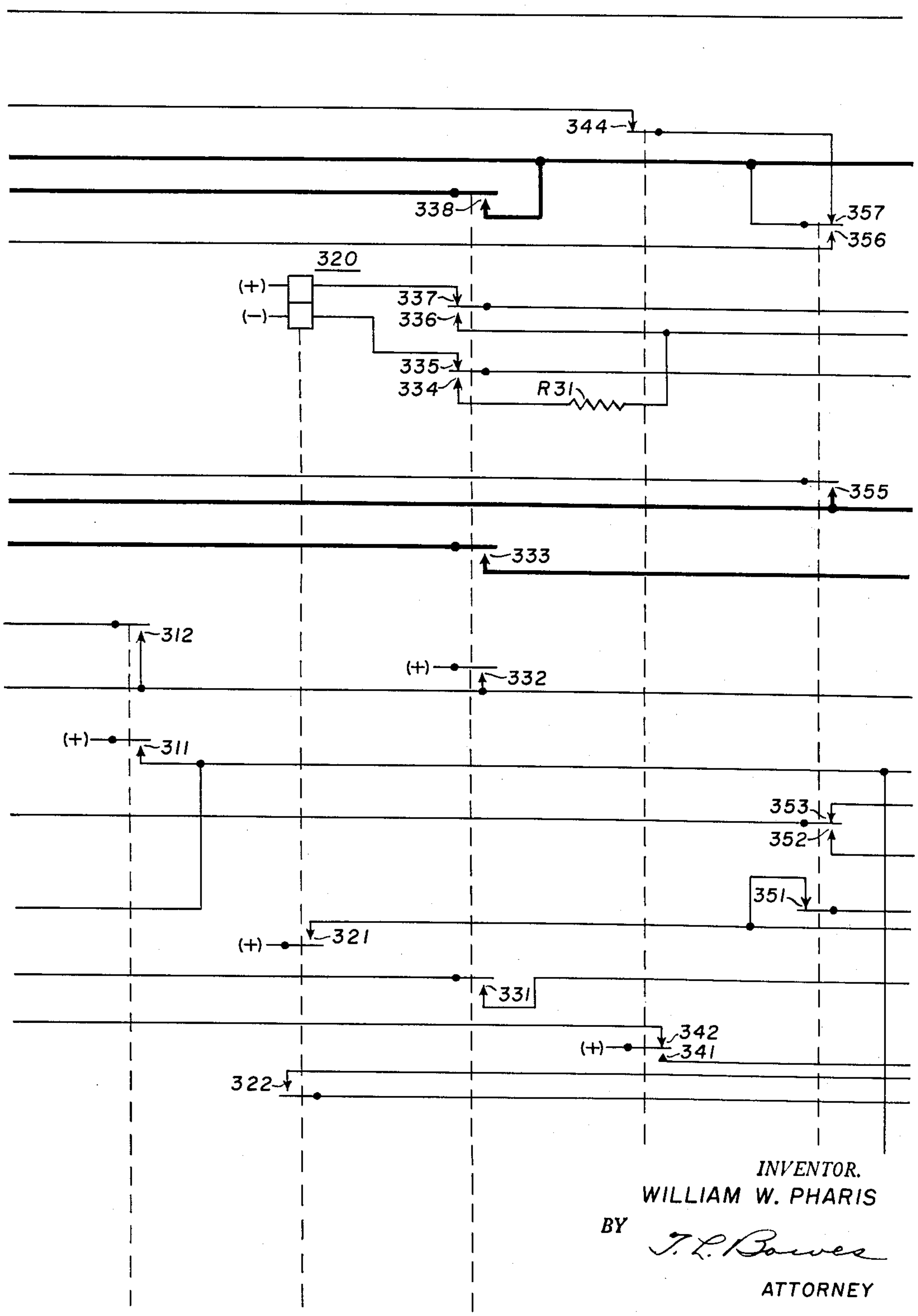
Figure 4:
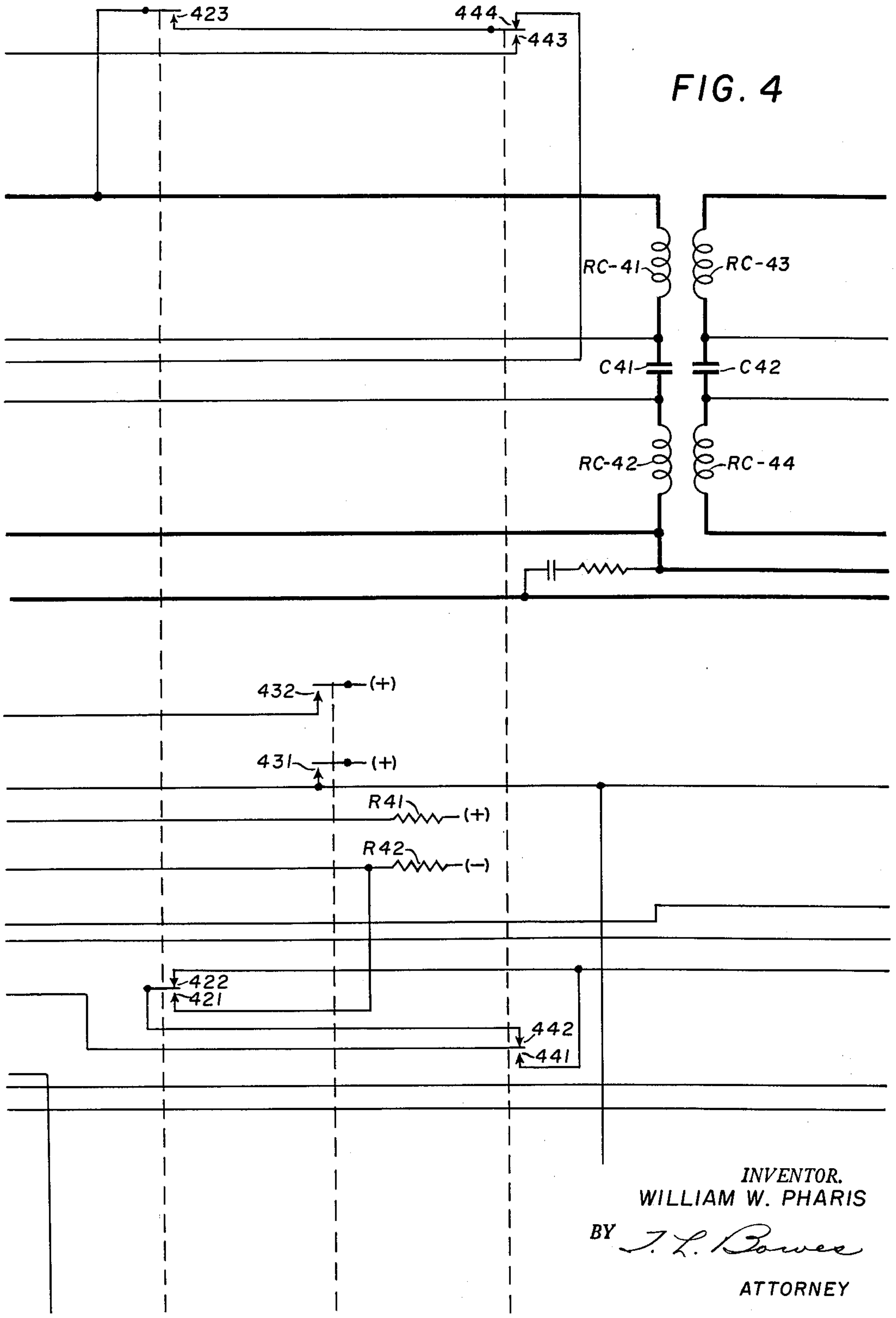
Figure 5:
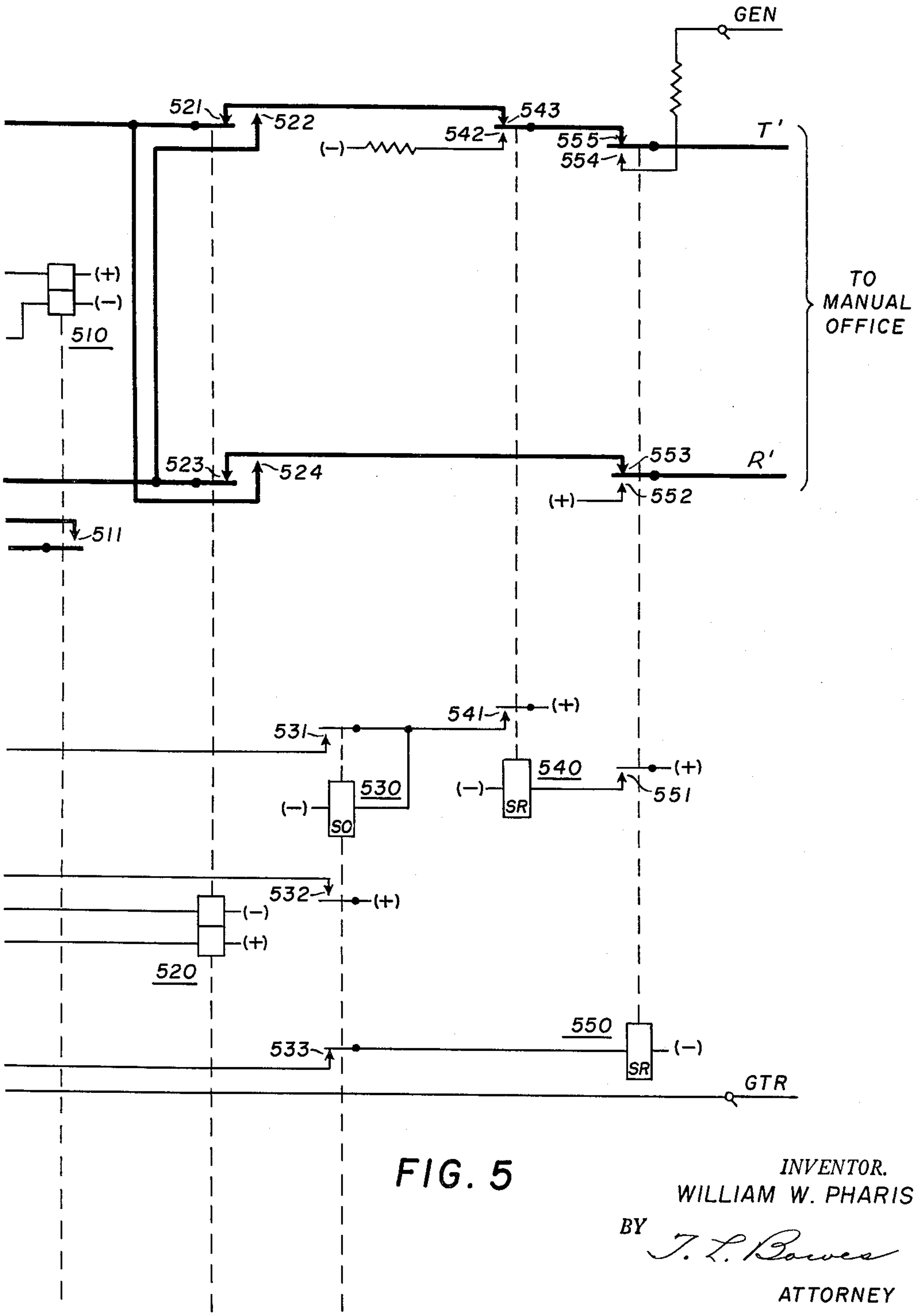
Figure 7:
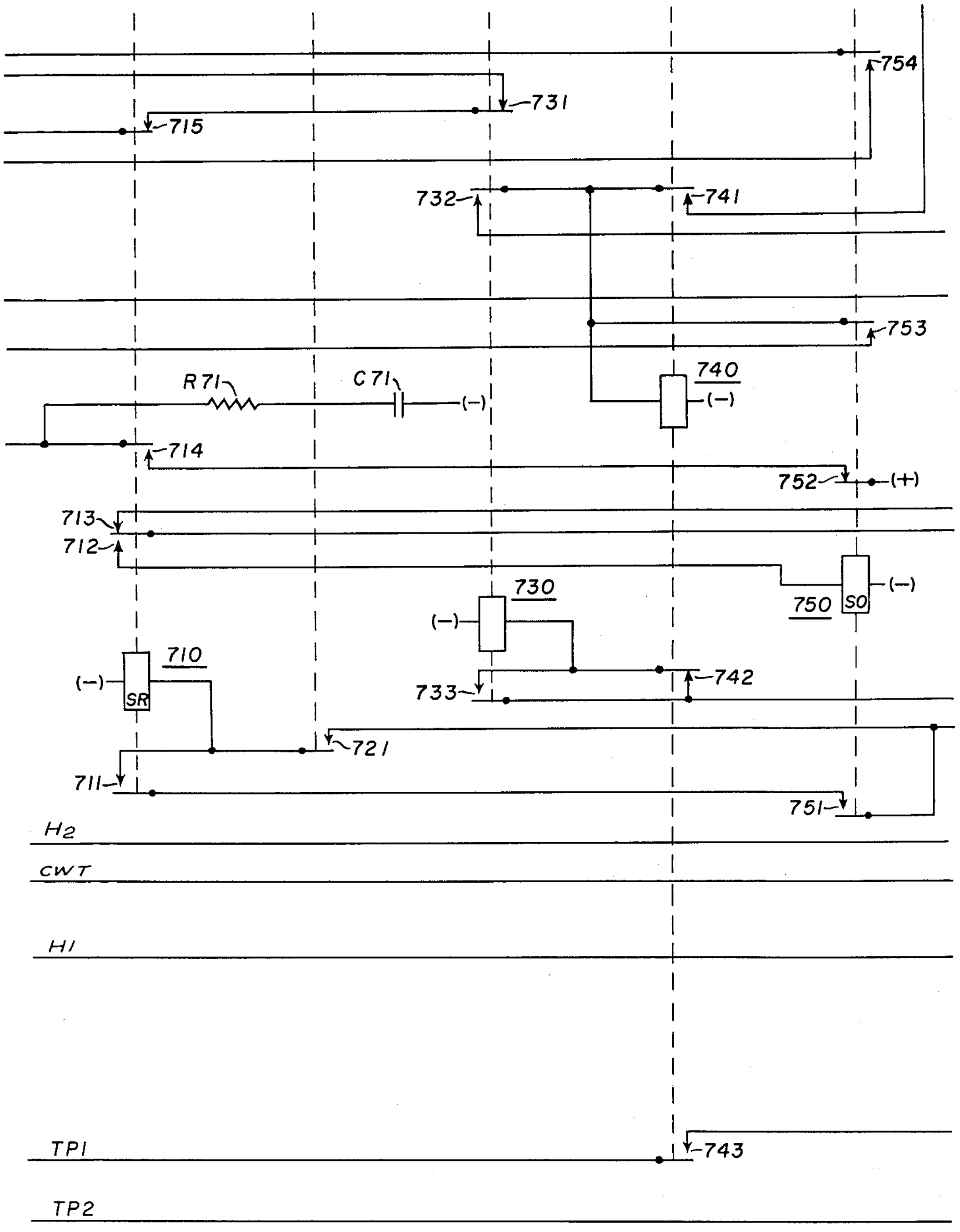
Figure 8:
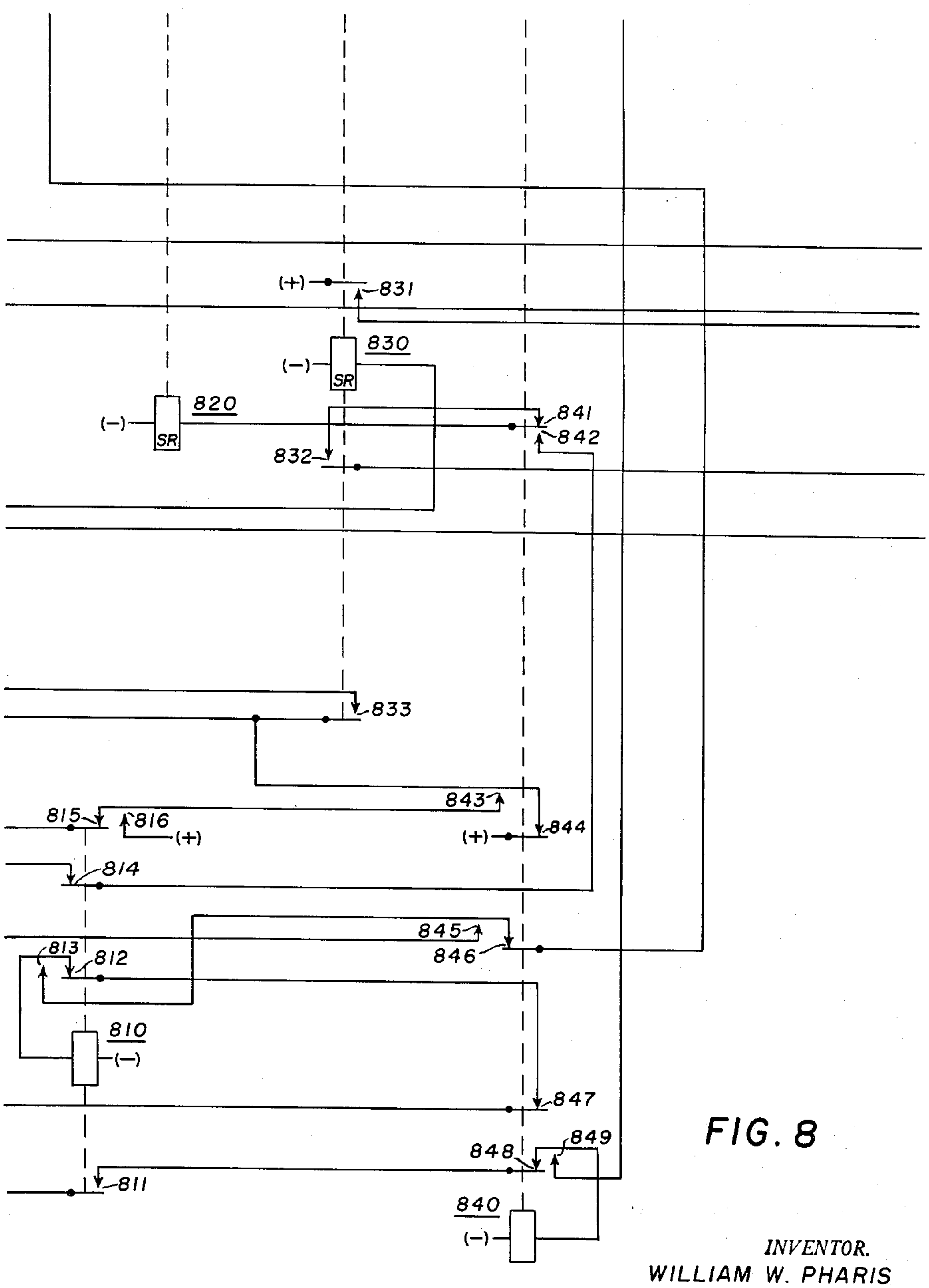
Figure 9:
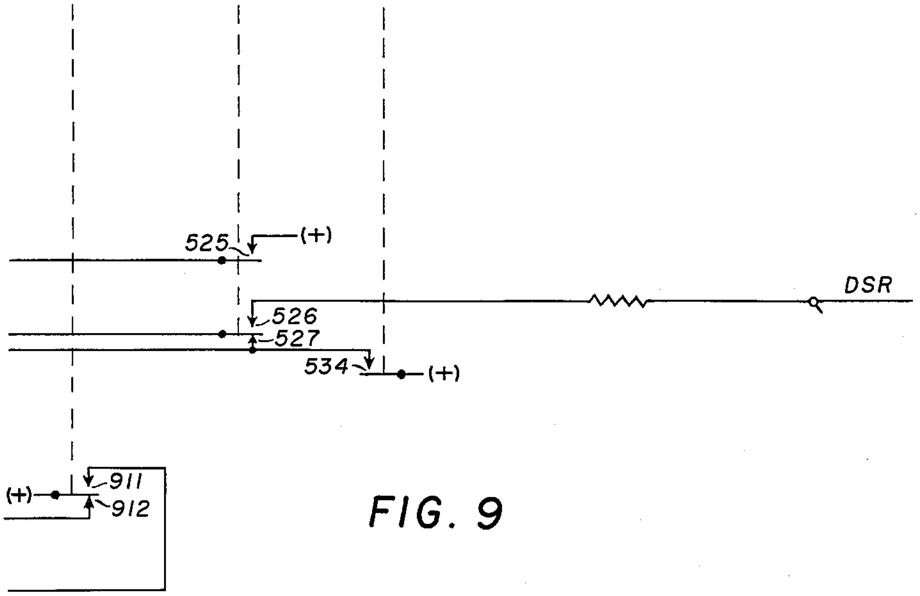
Figure 11:
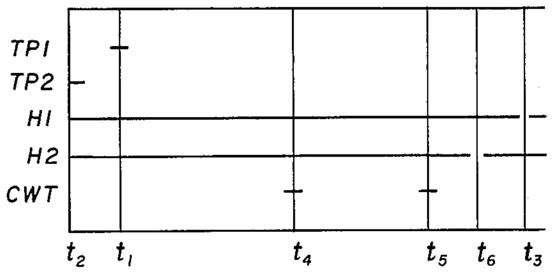
Figure 10:
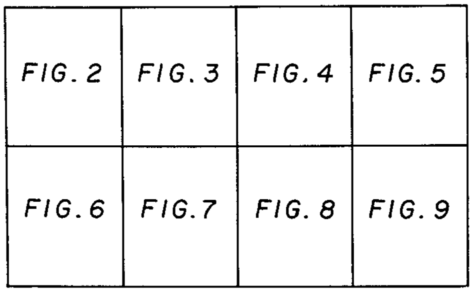

Other objects and advantages of my invention will become apparent from the accompanying description and drawings in which Fig. 1 is a block diagram showing the elements of a telephone system embodying the principles of my invention, Figs. 2 to 9, inclusive, illustrate details of the trunk circuit embodying the principles of my invention when positioned as indicated in Fig. 10, And Fig. 11 is a timing chart which is useful in understanding the operation of my conversation timing circuit.

Referring to Fig. 1, there is shown a calling subscriber's station A associated with a suitable dial office or exchange to which access may be had by a suitable finder-selector link 1 which may be allotted in any desired manner to find a calling line. The selector switch of the finder-selector link may have access to the two-way dial-to-manual trunk 2 illustrated in detail in Figs. 2–9, inclusive, and the two-way trunk is illustrated as being connected to a suitable operator's position 3 of a suitable manual office or exchange.

For calls from the operator's station 3 to the subscriber station A, there is provided a suitable incoming selector 4 connected to the dial-to-manual trunk 2. The switch of the incoming selector is shown having access to the calling subscriber.

*Outgoing call*

Referring to Figs. 2–9, there is described in detail a two-way dial-to-manual trunk embodying the principles of my invention. At this point it is to be noted that the station battery is assumed to have its positive terminal grounded and hereinafter the term "ground" is used to indicate the grounded positive terminal. Correspondingly, the expression "battery" is used to indicate connection to the negative terminal of the station battery. It is assumed that a call initiated at subscriber's station A has resulted in the seizure by a suitable finder-selector link of the trunk.

When the trunk is seized, calling bridge relay 320 is operated from the calling loop over tip lead T through repeat coil winding RC–41 and normal contact 337, and the upper winding of relay 320 to ground; the circuit is completed to battery from the calling loop over the ring lead R through repeat coil winding RC–42, normal contacts 335 and the lower winding of calling bridge relay 320.

In response to the operation of calling bridge relay 320, there is closed a circuit for operating release delay relay 710 by way of operated contacts 721 of calling bridge relay 320 and normal contacts 844 to ground; ringing relay 550 is connected to the generator test ground lead GTR (Fig. 5) through normal contacts 533 and operated contacts 322; and a circuit is completed for operating relay 520 from ground through operated contacts 321 and the upper winding of relay 520 to battery.

The operation of release delay relay 710 effects the connection of ground to sleeve lead S by way of busy key contacts BK–2, operated contacts 312 and normal contacts 112 to ground; closes a circuit to operate coin tone relay 610 through normal contacts 752 and operated contacts 714; and removes ground from the all trunks busy lead ATB at contacts 715. Coin tone relay 610 is made slow-to-operate by the provision of series connected resistor R71 and capacitor C71 shunting the winding of the relay.

In response to the operation of relay 610, the ring back tone lead RBT is connected to the line by way of operated contacts 115 and normal contacts 344 and 357; the shunt to the primary of tone coil TC–21 is opened at now open or operated contacts 112; and the monitor lamp lead MSR is grounded at contacts 612.

Referring again to the operation of relay 320, ringing relay 550 operates upon the appearance of ground on lead GTR which signifies that the generator or other source of ground is working properly, whereupon a circuit is completed for operating relay 540 at operated contacts 551; and continuous generator is connected to the tip lead T′ through operated contacts 554 in order to signal the distant operator, the ring source return to ground including the ring lead R′ and operated contacts 552.

Relay 540 operates and closes a circuit for energizing slow-to-operate relay 530 at contacts 541.

When relay 530 operates, after a short time delay, the energizing circuit for relay 550 is opened at contacts 533; relay 530 locks to ground through its own operated contacts 531 and operated contacts 311; and an alternate circuit is closed for holding previously operated relay 520 through the upper winding of relay 520, normal contacts 351 and operated contacts 532.

In response to the previous operation of relay 520, it may be noted, the tip and ring leads T′ and R′ were reversed at contacts 522 and 524, respectively. Now, when relay 550 releases after a time delay, relay 550 being slow-to-release, ringing is disconnected upon the opening of contacts 554 and 552 and the reversed ring lead is extended through to the distant office at contacts 553 and the outgoing circuit is prepared to extend the reversed tip lead to the distant office at contacts 555. Moreover the release of relay 550 opens the energization circuit for slow-to-release relay 540 at now open contacts 551.

Relay 540 restores after a time delay to extend the reversed tip connection or lead T′ through contacts 543 and opens the energization circuit for relay 530 at contacts 541 after a time delay but relay 530 holds up through the previously described locking circuit by way of contacts 531 and 311.

When the operator at operator's position 3 answers the call, there is completed a loop to operate pulsing relay 510 from ground through the upper winding of relay 510, repeat coil winding RC–43, operated contacts 524, normal contacts 553, ring lead R′, loop, tip lead T′, normal contacts 555 and 543, operated contacts 522, repeat coil winding RC–44, and the lower winding of relay 510 to battery. Responsive to the operation of pulsing relay 510 there is completed a circuit for energizing relay 750 by way of operated contacts 712 and 911 to ground; the holding circuit for relay 710 is transferred from operated contacts 721 to operated contacts 711 and 751 to ground through normal contacts 844 so that relay 710 is maintained energized from the manual end of the trunk if the calling party releases prior to disconnect by the operator.

Upon the operation of relay 750, the HS lead from the preceding switch banks is transferred from resistance ground at normal contacts 353 to resistance battery at contacts 352; the energizing circuit for coin tone relay 610 is opened at contacts 752; the secondary of tone coil TC–22 is momentarily connected across the tip and ring leads at contacts 356 and 355, respectively, by way of contacts 114 and 113, respectively, to forward a pulse of paystation tone (which is present on the primary winding TC–21 of tone coil TC by way of the sleeve lead if the call originated at the paystation) to the operator; and disconnects ring back tone lead RBT at contacts 357.

In response to the opening of its energizing circuit, relay 610 restores and thereby removes ground from lead MSR at contacts 612; shunts tone coil winding TC–21 at contacts 112; disconnects tone coil secondary TC–22 from the transmission circuit at contacts 113 and 114; and operates relay 740 over a circuit extending from battery through its winding, operated contacts 753 and normal contacts 611, and operated contacts 311 to ground. Relay 740 locks to ground through its operated contacts 741 and operated contacts 311.

A conversation circuit is now completed and conversation may proceed.

*Release.*—If the calling party disconnects first, the loop for calling bridge relay 320 is opened and relay 320 restores and opens the circuit for relay 520 at contacts 321. Relay 520 restores to reverse battery over the trunk at contacts 521 and 523, thereby giving disconnect supervision.

When the operator disconnects, the circuit for holding relay 510 is opened, relay 510 restores and opens contacts 911, thereby releasing relay 750. Restoration of relay 750 effects the de-energization of relay 710 at contacts 751. After a time delay, relay 710 releases to open sleeve ground at contacts 312. When relay 710 restores, relay 740 is released at contacts 311 and relay 530 releases upon the opening of contacts 311.

If the operator releases first, relay 510 restores to open the circuit for relay 750 at contacts 911. Upon the restoration of relay 750, one of the circuits for maintaining relay 710 is opened at contacts 751.

As soon as the calling party disconnects or restores thereafter, the calling bridge relay 320 is released because of the opening of the loop to the subscriber's substation whereupon the circuit for relay 520 is opened at contacts 321 and the second holding circuit for relay 710 is opened at contacts 721. Relay 520 releases to reverse battery over the trunk and to ground the MSR lead through normal contacts 613, 527 and operated contacts 534. Responsive to the release of relay 710, relays 740 and 530 are released at contacts 311.

*Incoming call*

On a call initiated at operator's position 3, when the operator connects the manual office to leads T' and R' of the trunk circuit, there is completed a loop for operating pulsing relay 510 over lead T', by way of contacts 555, 543, 521, repeat coil winding RC–43 and the upper winding of relay 510 to battery and over the ring lead R' by way of contacts 553, 523, repeat coil winding RC–44, and the lower winding of relay 510 to battery.

In response to the operation of relay 510, release delay relay 830 is energized over a circuit extending from ground through operated contacts 911, normal contacts

713, and the winding of relay 830 to battery. The operation of relay 830 effects the grounding of the lead MSR through contacts 613, 527 and 831; establishes a holding or master ground at contacts 431; and operates slave relay 730 through its winding by way of normal contacts 742, operated contacts 833 and normal contacts 844. The operation of relay 730 completes a metallic loop across tip and ring leads T'' and R,'' respectively, the circuit comprising lead T,'' operated contacts 338 of relay 830, coil RC–41, operated contacts 336 of relay 830, resistor R31, operated contacts 334 of relay 830, coil RC–42, operated contacts 511 and 333 to lead R''. Relay 730 locks up to ground by way of operated contacts 733, operated contacts 833 and normal contacts 844.

*Impulsing.*—Relay 510 follows the dial pulses transmitted by the operator. On the first restoration of relay 510 at the end of the first pulse of the first digit, the circuit for relay 830 is opened at contacts 911. Relay 830, being slow-to-release, holds operated during the dialing of each digit. Relay 820 is energized through its winding by way of normal contacts 841, still operated contacts 832, and normal contacts 912.

In response to the operation of relay 820, repeat coil winding RC–41 is shunted from tip lead T through operated contacts 423, normal contacts 444 and operated contacts 336 to the lower end of winding RC–41 in order to prevent impulse distortion; and resistance battery is connected to the HS'' lead for toll marking, the circuit extending from the HS'' lead by way of operated contacts 331, normal contacts 442, operated contacts 421, and resistance R42 to battery.

Upon the reoperation of pulsing relay 510 upon the second closure of the loop, relay 510 reoperates to reclose the circuit for energizing relay 830', and opens the circuit for energizing relay 820 at now open contacts 912. Relay 820, however, being slow-to-release, holds operated through the remaining pulses of the digit.

After the last impulse, relay 510 upon reoperating, again re-energizes relay 830 and again reopens the circuit for relay 820 whereupon relay 820 restores after a time delay and removes the shunt from repeat coil RC–41 at contacts 423.

*Answer.*—When the called party answers, battery is placed on the HS'' lead in any suitable fashion. For example, a suitable relay indicated by the numeral 130 and located in a suitable trunk circuit or other succeeding circuit may be suitably operated to connect resistance ground to the incoming HS'' lead through suitable contacts 132 in order to operate relay 520, the circuit extending from incoming lead HS'' by way of contacts 331, 442 and normal contacts 422 through the lower winding of relay 520, thereby reversing battery to the distant office at contacts 522 and 524 to give answer supervision and to operate relay 740 by way of contacts 525 and 732 to open the ring back tone lead RBT at contacts 344. Conversation may now take place.

*Release.*—If the called party releases first, ground applied to the HS'' lead, as by the release of relay 130 in any suitable fashion to connect resistance ground to the incoming HS'' lead through normal contacts 132, effects the shunting of the winding of relay 520 which restores. When the operator thereafter disconnects, relay 510 releases, and the loop is opened to the succeeding equipment. Relay 830 is de-energized at contacts 911 and upon the eventual release of this relay, relay 730 is de-energized at contacts 833.

If the calling party disconnects first, relay 510 releases upon disconnect by the operator at the manual station, which effects the de-energization of relay 830 at contacts 911 and the re-energization of relay 820 through contacts 912 during the release time of relay 830. Relay 820 reoperates but the reoperation thereof is not effective at this time. Upon the release of relay 830, relay 820 is de-energized at contacts 832 and releases after a time delay. Also responsive to the release of relay 830, relay 730 is de-energized at contacts 833. When, thereafter, the called party restores, battery is removed from the HS″ lead and relay 520 restores.

*Recall*

When the called party desires to recall the operator, flashing of the hookswitch causes the succeeding circuit to flash relay 520 over the HS″ lead between resistance ground and resistance battery. Relay 520 follows the flashes and gives reverse battery flashes to the distant office.

*Conversation timing*

*Outgoing calls.*—With a conversation circuit established, it will be recalled that relay 740 is operated. A circuit is now completed for operating timing relay 810 over timing lead TP1 through operated contacts 743, normal contacts 847 and 812 and the winding of relay 810. Thus, referring to the timing chart of Fig. 11, when the first pulse on lead TP1 appears at time $t_1$, relay 810 operates and thereby connects timing lead TP2 to the second timing relay 840 through contacts 811 and 848, and also completes a locking circuit for relay 810 by way of operated contacts 813, normal contacts 846 and operated contacts 341 to ground. Upon the appearance of a ground pulse on lead TP2 at time $t_2$ during the next cycle of the timing apparatus, timing relay 840 is operated over the prepared circuit and locks to ground through operated contacts 849 and 311; transfers the holding circuit for relay 810 from ground at contacts 341 through contacts 846 to the grounded hold lead H1 through transfer contacts 845; and transfers the holding ground for relay 710 from contacts 844 to ground at contacts 816 through transfer contacts 843.

Referring again to the timing chart, it is seen that the timing equipment is arranged to open the H1 lead at time $t_3$. Loss of ground on lead H1 at this time effects the release of relay 810. The release of relay 810 connects lead CWT to relay 820 by way of normal contacts 814 and operated contacts 842; and transfers the holding ground for relay 710 from operated contacts 816 to the holding ground lead H2 at contacts 815.

The next pulse on lead TP1 does not operate relay 810 because of open contacts 847. However, the appearance of a ground pulse on lead CWT at time $t_4$ is employed to operate relay 820 through normal contacts 814 and operated contacts 842.

Upon the operation of relay 820, warning tone is applied by way of lead WT, operated contacts 443 and 423 to tip lead T to warn the party that a certain period of time has elapsed. Relay 820 releases after a time delay following the removal of the ground pulse from lead CWT. The same sequence of events happens upon the appearance of the second pulse on lead CWT at time $t_5$, again warning the party that another period of conversation time has elapsed. At time $t_6$, holding ground is removed temporarily from holding lead H2, thereby opening the holding circuit for relay 710. When relay 710 releases, relay 740 is de-energized at contacts 311 and relay 750 is released at contacts 712. The opening of contacts 742 upon the release of relay 740, locks out relay 730 to prevent seizure of the incoming switch when relay 830 operates at a later time.

In order to prevent reseizure before the operator disconnects, the release of relay 710 is utilized to effect the operation of relay 830 by way of operated contacts 911 and normal contacts 713 to the winding of relay 830. The operation of relay 830 grounds sleeve S at contacts 432.

*Incoming calls.*—It will be recalled that relay 520 is operated upon answering by the called party, and that in response to the operation of relay 520, relay 740 is operated by way of contacts 732 and 525. With relay 740 operated, a circuit is completed for energizing timing relay 810 from lead TP1 through contacts 743, 847, and 812 and the winding of relay 810. When the first ground pulse appears on lead TP1 at time $t_1$, relay 810 operates and locks through operated contacts 813, normal contacts 846, and operated contacts 341 to ground. Relay 810 also connects lead TP2 to the second timing relay 840 by way of operated contacts 811 and normal contacts 848. Upon the appearance of the second timing or ground pulse on lead TP2 at time $t_2$, relay 840 is operated over the previously described circuit and locks through operated transfer contacts 849 and operated contacts 311.

The operation of relay 840 also opens the energization circuit for relay 810 at contacts 847 but transfers a holding circuit for relay 810 from ground at contacts 341 through contacts 846 to the grounded hold lead H1 through transfer contacts 845.

The loss of ground on hold lead H1 at time $t_3$ releases relay 810 to connect conversation warning tone lead CWT to relay 820 through normal contacts 814 and operated contacts 842.

The first ground pulse on lead CWT at time $t_4$ operates relay 820 over a circuit extending through normal contacts 814 and operated contacts 842. The operation of relay 820 applies warning tone to the line through contacts 423 and 443. Relay 820 releases after a time delay following the termination of the ground pulse. The same sequence follows the appearance of the second ground pulse on lead CWT at time $t_5$. At time $t_6$ if the conversation is still continuing, ground is removed temporarily from hold lead H2 which effects the de-energization of relay 730. In response to the release of relay 730, the loop is opened at contacts 333 and 338 and the switch train drops out. The substitution thereafter of resistance ground for resistance battery on lead HS″, following the release of relay 130 causes the shunting down of relay 520.

In accordance with my invention, means is provided for locking out the trunk circuit after timing out on incoming calls by locking out relay 730 until the operator disconnects her cord circuit and releases the trunk. For this purpose, relay 740 is held operated through contacts 741 and 431 as long as the operator holds so that contacts 742 are held open, thereby holding open the energization path for relay 730. When the operator disconnects at the manual end, relay 510 releases because of the open loop, thereby de-energizing relay 830 at contacts 911. The release of relay 830 effects the de-energization of relays 740 and 840 at contacts 431. The release of relay 740 eliminates the lockout feature because of the closure of normal contacts 742 and the trunk circuit is again available for service.

What I claim is:

1. In a telephone system, a manual office, a dial office, said dial office including switching apparatus, a two-way trunk circuit, means for extending a connection from said manual office through said dial office by way of said trunk circuit and said switching apparatus, conversation timing means, means responsive to the extension of a connection from said manual office through said dial office for initiating the operation of said conversation timing means for timing the duration of said call and for releasing said switching apparatus if said call is not terminated within a predetermined time, lockout means, and means responsive to the release of said switching apparatus prior to disconnection at said manual office for causing said lockout means to lock out said trunk to prevent seizure from said dial office.

2. In a telephone system, a manual office, a dial office, said dial office including switching apparatus, a two-way trunk circuit, means for extending a connection from said manual office through said dial office by way of said trunk circuit and said switching apparatus, conversation timing means, means responsive to the extension of a connection from said manual office through said dial office for initiating the operation of said conversation timing means for timing the duration of said call and for releasing said switching apparatus if said call is not terminated within a predetermined time, means responsive to the release of said switching apparatus prior to disconnection at said manual office for locking out said trunk to prevent seizure from said dial office, and means responsive to disconnection at said manual office thereafter for making available said trunk for further service.

3. In a telephone system, a manual office, a dial office including switching apparatus, a two-way trunk circuit, means for extending a connection from said manual office to said dial office through said two-way trunk and said switching apparatus, said trunk circuit having a relay, means responsive to the seizure of said trunk circuit from said manual office for operating said relay, conversation timing means, means responsive to the completion of said extension from said manual office through said dial office for initiating operation of said conversation timing means for timing the call, means utilizing said conversation timing means for releasing said switching apparatus after a predetermined time if the call is not terminated within said predetermined time, means responsive to the release of said switching apparatus for releasing said relay, and means effective during the period following the release of said switching apparatus and disconnection thereafter at said manual office for preventing re-energization of said relay.

4. In a telephone system, a manual office, a dial office including switching apparatus, a two-way trunk circuit, means for extending a connection from said manual office to said dial office through said two-way trunk and said switching apparatus, said trunk circuit having a relay, means responsive to the seizure of said trunk circuit from said manual office for operating said relay, conversation timing means, means responsive to the completion of said extension from said manual office through said dial office for initiating operation of said conversation timing means for timing the call, means utilizing said conversation timing means for releasing said switching apparatus after a predetermined time if the call is not terminated within said predetermined time, means responsive to the release of said switching apparatus for releasing said relay, means effective during the period following the release of said switching apparatus and disconnection thereafter at said manual office for preventing re-energization of said relay, and means responsive to disconnection at said manual office thereafter for permitting operation of said relay.

5. In a telephone system, a manual office, a dial office including switching apparatus, a two-way trunk circuit, said trunk circuit having a first relay and a second relay, means responsive to the seizure of said trunk circuit from said manual office for operating said first relay, means including said switching apparatus for extending a connection from said trunk circuit through said dial office to a called line, conversation timing means, means responsive to the completion of said extension from said trunk circuit through said dial office for operating said second relay and initiating operation of said conversation timing means for timing the duration of the extended connection, means utilizing said conversation timing means for releasing said switching apparatus after a predetermined time if the extended connection is not released within said predetermined time, means responsive to the release of said switching apparatus for releasing said first relay, means responsive to the continued connection of said manual office to said trunk circuit for maintaining operated said second relay, and means effective while said second relay is maintained operated for preventing the re-operation of said first relay.

6. In a telephone system, a manual office, a dial office including switching apparatus, a two-way trunk circuit, said trunk circuit having a first relay and a second relay, means responsive to the seizure of said trunk circuit from said manual office for operating said first relay, means including said switching apparatus for extending a connection from said trunk circuit through said dial office to a called line, conversation timing means, means responsive to the completion of said extension from said trunk circuit through said dial office for operating said second relay and initiating operation of said conversation timing means for timing the duration of the extended connection, means utilizing said conversation timing means for releasing said switching apparatus after a predetermined time if the extended connection is not released within said predetermined time, means responsive to the release of said switching apparatus for releasing said first relay, means responsive to the continued connection of said manual office to said trunk circuit for maintaining operated said second relay, means effective while said second relay is maintained operated for preventing the re-operation of said first relay, and means responsive to disconnection at said manual office thereafter for permitting the re-operation of said first relay.

References Cited in the file of this patent

UNITED STATES PATENTS

| | | |
|---|---|---|
| 2,133,682 | Bakker | Oct. 18, 1938 |
| 2,232,181 | McClew et al. | Feb. 18, 1941 |
| 2,488,797 | Baker | Nov. 22, 1949 |
| 2,595,062 | Elliott | Apr. 29, 1952 |